(12) United States Patent
Bergen et al.

(10) Patent No.: US 7,702,178 B2
(45) Date of Patent: Apr. 20, 2010

(54) METHOD AND APPARATUS FOR PROVIDING NOISE REDUCTION

(75) Inventors: James Bergen, Hopewell, NJ (US); Chao Zhang, Belle Mead, NJ (US); Gooitzen Van Der Wal, Hopewell, NJ (US)

(73) Assignee: Sarnoff Corporation, Princeton, NJ (US)

( * ) Notice: Subject to any disclaimer, the term of this patent is extended or adjusted under 35 U.S.C. 154(b) by 1316 days.

(21) Appl. No.: 11/081,255

(22) Filed: Mar. 15, 2005

(65) Prior Publication Data

US 2006/0109903 A1   May 25, 2006

Related U.S. Application Data

(60) Provisional application No. 60/553,357, filed on Mar. 15, 2004.

(51) Int. Cl.
*G06K 9/40* (2006.01)
(52) U.S. Cl. .................. 382/275; 382/260; 382/274
(58) Field of Classification Search .......... 382/260, 382/274, 275, 287; 358/3.26, 3.27, 463
See application file for complete search history.

(56) References Cited

U.S. PATENT DOCUMENTS

| | | | |
|---|---|---|---|
| 4,444,196 A | 4/1984 | Stein | |
| 4,543,605 A | 9/1985 | Verhoeven | |
| 4,952,794 A | 8/1990 | Kemner et al. | |
| 5,296,930 A | 3/1994 | Thomson | |
| 5,319,749 A | 6/1994 | Haaker et al. | |
| 5,600,731 A * | 2/1997 | Sezan et al. | 382/107 |
| 5,767,911 A * | 6/1998 | Boon | 375/240.12 |
| 5,982,441 A * | 11/1999 | Hurd et al. | 348/417.1 |
| 6,061,644 A * | 5/2000 | Leis | 702/153 |
| 6,084,981 A * | 7/2000 | Horiba et al. | 382/157 |
| 6,298,144 B1 * | 10/2001 | Pucker et al. | 382/103 |
| 6,445,816 B1 * | 9/2002 | Pettigrew | 382/162 |
| 6,707,487 B1 * | 3/2004 | Aman et al. | 348/169 |
| 6,760,401 B2 * | 7/2004 | Schmitz et al. | 378/62 |
| 6,784,944 B2 * | 8/2004 | Zhang et al. | 348/607 |
| 7,181,081 B2 * | 2/2007 | Sandrew | 382/254 |

\* cited by examiner

*Primary Examiner*—Yosef Kassa
(74) *Attorney, Agent, or Firm*—Lowenstein Sandler PC (57) ABSTRACT

A method and apparatus for reducing noise in at least one frame in an image sequence is disclosed. A minimum function is applied to the at least one frame to produce a plurality of minimum values. A mask is generated in accordance with the plurality of minimum values. The mask is applied to reduce the noise in the at least one frame. In one embodiment, impulse noise is reduced. In another embodiment wideband non-linear noise is reduced.

9 Claims, 6 Drawing Sheets

METHOD AND APPARATUS FOR PROVIDING NOISE REDUCTION

CROSS-REFERENCE TO RELATED APPLICATIONS

This application claims benefit of United States provisional patent application Ser. No. 60/553,357, filed Mar. 15, 2004, which is herein incorporated by reference.

GOVERNMENT RIGHTS IN THIS INVENTION

This invention was made with U.S. government support under contract number GNVESD0610 from U.S. Army CECOM. The U.S. government has certain rights in this invention.

BACKGROUND OF THE INVENTION

1. Field of the Invention

Embodiments of the present invention generally relate to a method and apparatus for providing noise reduction. More specifically, the present invention reduces noise in Image Intensified Television (IITV) imagery.

2. Description of the Related Art

Image Intensified Television (IITV) imagery is affected by characteristic noise components that result from the physics of the microchannel plate electron multiplier that forms the core of IITV devices. IITV noise may contain two components of distinctly different spatial and temporal characteristics: impulse noise and Gaussian noise. If the noise components are not removed from the IITV image, further processing of the IITV image using other techniques, e.g., image fusion, is limited.

Therefore there is a need in the art for a method and apparatus for reducing the appearance of IITV noise components.

SUMMARY OF THE INVENTION

The present invention generally relates to a method and apparatus for reducing noise in at least one frame in an image sequence. In one embodiment, a minimum function is applied to the at least one frame to produce a plurality of minimum values. A mask is generated in accordance with the plurality of minimum values. The mask is applied to reduce the noise in the at least one frame.

In one embodiment, impulse noise is reduced. In another embodiment wideband non-linear noise is reduced.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
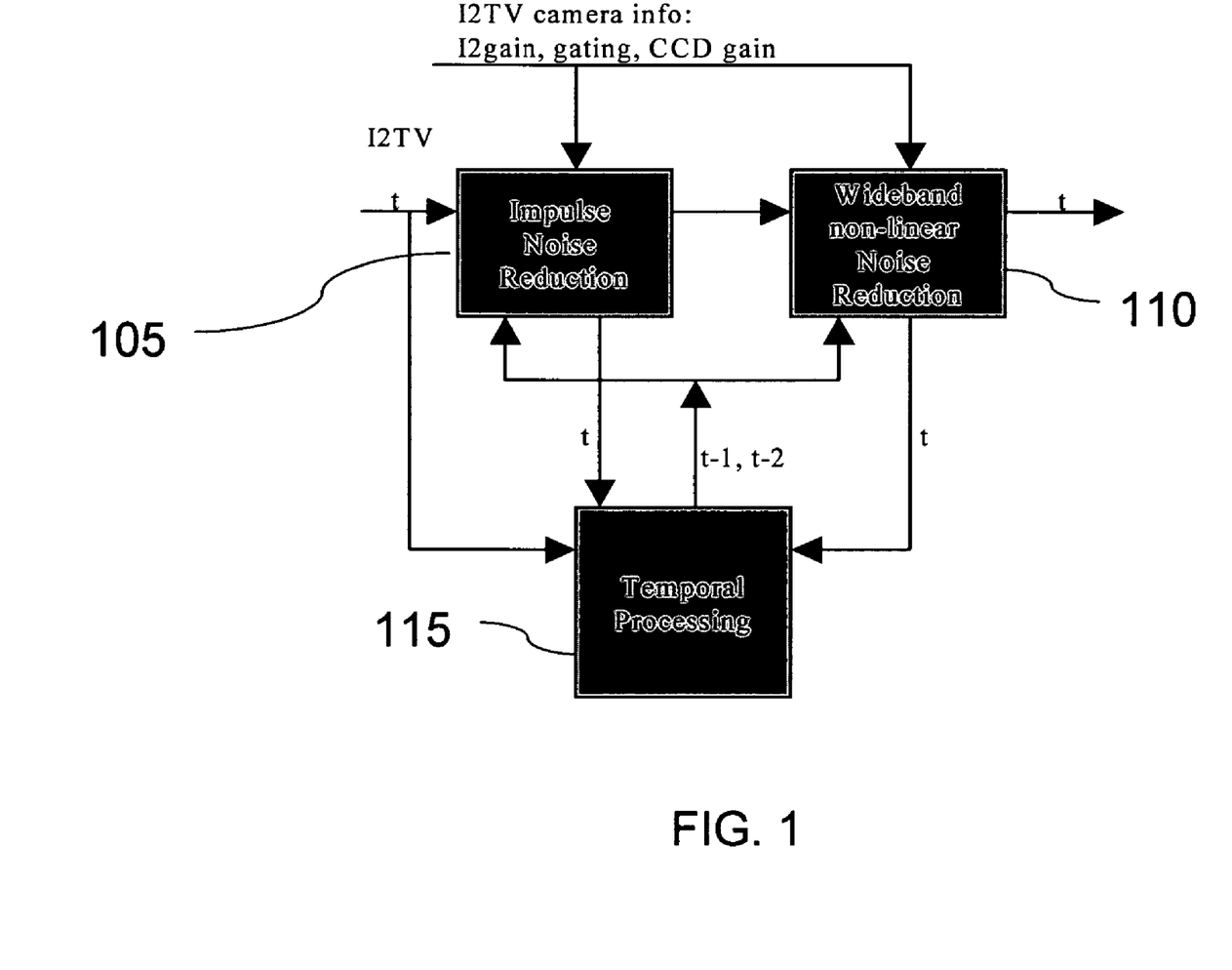
FIG. 1 illustrates a noise reduction architecture according to one embodiment of the present invention.

FIG. 1 illustrates a noise reduction architecture according to one embodiment of the present invention. The noise reduction architecture, as shown in FIG. 1, has three main blocks: impulse noise reduction block 105, wideband nonlinear noise reduction block 110, and temporal processing block 115. Impulse noise reduction block 105 utilizes at least a minimum filter as described below to remove most of the bright brief "speckle" noises, and recovers the original image features that might be lost after the minimum filter. Wideband non-linear noise reduction block 110 reduces Gaussian noise that has a long temporal correlation and wide spatial frequency spectrum. In one embodiment, temporal processing block 115 keeps a plurality of frames and calculates motion estimations between them. The aligned frames may be used in blocks 105, 110.

An IITV signal may be received at impulse noise reduction block 105 and temporal processing block 115. Impulse noise reduction block 105 uses the received IITV signal in order to remove impulse noise. Delayed versions of the IITV signal may also be used by block 105 in conjunction with temporal processing block 115, in order to remove impulse noise. In one embodiment, wideband non-linear noise reduction block 110 receives the impulse noise reduced signal and removes a Gaussian noise component from the impulse noise reduced signal. Wideband non-linear noise reduction block 110 may also use delayed versions of IITV signal from temporal processing block 115 to assist in removing Gaussian noise. Temporal processing block 115 may also utilize input from impulse noise reduction block 105 and wideband non-linear noise reduction block 110 in order to refine temporal signal analysis. Impulse noise reduction block 105 and wideband non-linear noise reduction block 110 may receive IITV camera parameters, e.g., the gain of the image intensifier or the gain of the CCD imager used to capture the intensified image.

Wideband non-linear noise reduction block 110 is shown to receive signal input from impulse noise reduction block 105. However, it should be apparent to one having skill in the art that wideband non-linear noise reduction block 110 may operate to remove Gaussian noise from an IITV signal that has not had impulse noise removed.

As stated previously, IITV noise may contain two components of distinctly different spatial and temporal characteristics: impulse noise and Gaussian noise. High amplitude "impulse" noise comprises of bright, brief, small flashes that are characteristic of multichannel plate image intensifier devices. Broad-band "Gaussian" noise has more symmetric intensity characteristics and resembles spatiotemporally correlated thermal noise seen in a wide range of imaging devices.

In one embodiment, the present invention reduces impulse noise by making use of three critical characteristics of impulse noise. The first characteristic is that because impulse noise components result from random bursts of electrons within the multichannel plate structure, they appear as bright areas in the image once these electrons are converted to photons by the phosphor layer. There is no corresponding generation of dark areas. The second characteristic is that these random electron events are very brief, resulting in image events that may appear e.g., in only one field of the video sequence. The combination of these two characteristics allows the use of a simple inter-frame minimum filter, which is described below, to remove a large proportion of impulse noise artifacts since with high probability the noise impulse will be brighter than the corresponding pixel in the previous frame.

The third characteristic is that in addition to being bright and brief, impulse noise events also occupy only a small number of image pixels along a single scanline. For example, the bright region of a scanline may be three to four pixels wide. Thus, noise impulses can be selectively removed without removing other rapid increases in image brightness by selecting only those whose spatial structure has the expected charactistics. For other events such as single frame flashes of light, the current image intensity is retained.

Unlike the impulse noise component, the Gaussian noise component has a relatively broad spatial frequency spectrum and roughly symmetrical intensity distribution around the local image mean. The Gaussian noise component also has a relatively long temporal correlation.

Because of the extended correlation structure of the IITV noise, traditional linear filtering approaches are of limited effectiveness in reducing noise visibility. Long-time temporal averaging is effective but introduces unacceptable levels of latency and/or motion induced artifacts. For these reasons, a purely spatial approach based on adaptive nonlinear lookup table modification applied to signal components that concentrate noise structure is utilized.

Figure 2:
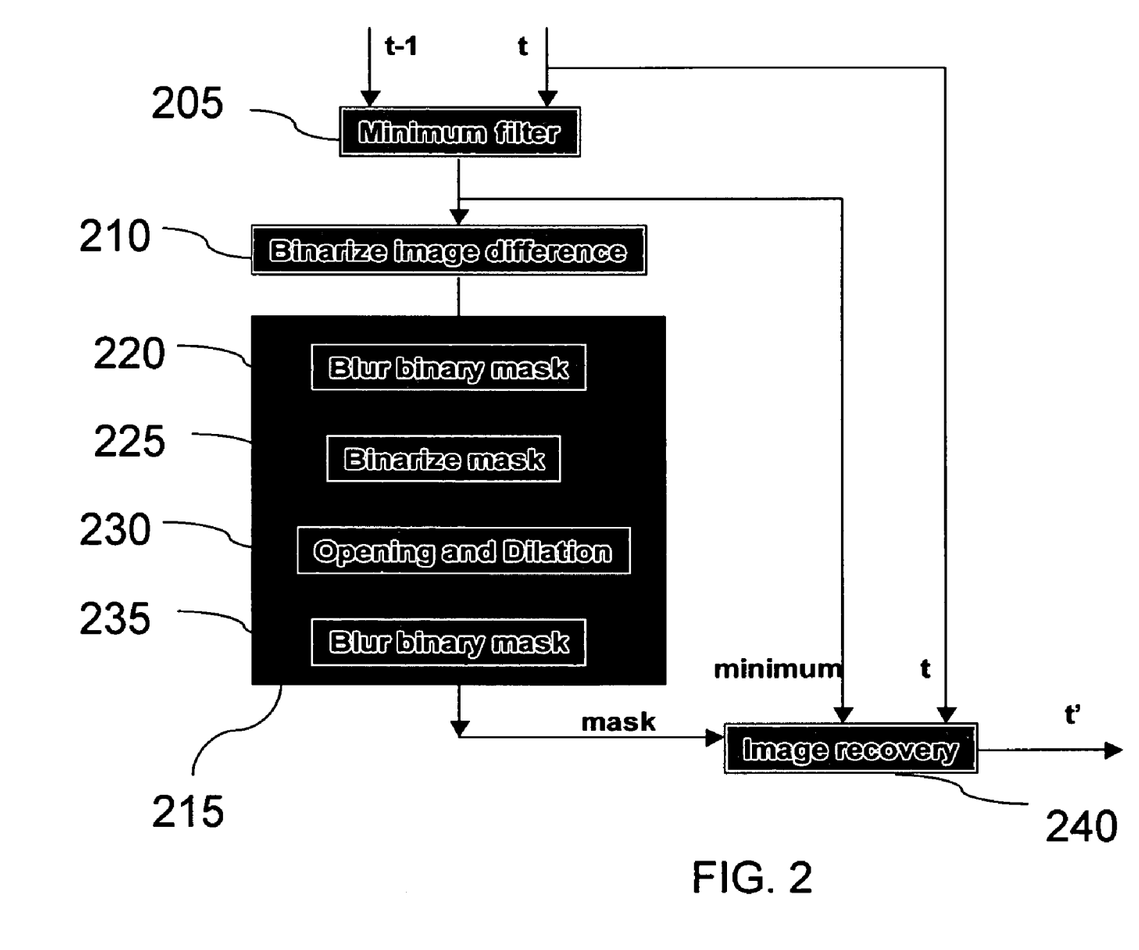
FIG. 2 illustrates one embodiment of a method for reducing impulse noise according to one embodiment of the present invention.

FIG. 2 illustrates one embodiment of a method for reducing impulse noise as deployed in the impulse noise removal block 105 that is used to remove speckle noise. As described above, IITV impulse noise component is temporally brief and bright.

In block 205, a minimum filter picks the minimum value at each pixel by comparing corresponding pixels from successive frames, e.g., frames t-1 and t. Because there is some possibility that two noise impulses can overlap on successive frames, or that some other noise event will contaminate the minimum image, a 3-frame minimum may also used to achieve better noise suppression. For example, if a value of 40 is at pixel location (0, 0) in frame t-1 and if a value of 20 is at pixel location (0, 0) in frame t, then the value of 20 will be selected by the minimum filter.

The image at time t-1 is roughly aligned with the current field at time t before the images pass through the minimum filter. This reduces most of the artifacts due to frame-to-frame motion.

In block 210, the minimum filter image is binarized. In order to identify regions that were replaced by the minimum filter, i.e., where "speckle" noise is removed, an image difference is binarized at block 210 to generate a binary mask. Block 210 thresholds between the minimum image and the original image. This binary mask can be described as the following mathematical criteria:

At each image location (x,y), assume Pt(x,y) is a pixel from the original image at time t, Min(x,y) is the result from the minimum filter, and THRESH is a threshold, $$\text{if } Pt(x,y) - \text{Min}(x,y) > \text{THRESH, then mask}(x,y) = 1, \quad (1)$$

otherwise, mask(x,y)=0.

If THRESH is set to be a small value, almost all the temporal and motion artifacts can be fixed, however, large impulse noise will persist. On the other hand, if THRESH is set too large, these artifacts are still available. THRESH may be determined by the typical size of the noise impulses in the clip, and thus is related to the camera setting. The value of THRESH and the morphological kernel size are carefully chosen such that a mask may be generated that covers the image areas of objects that would be removed by the minimum filter but not the noise impulses themselves. In one embodiment, THRESH may be 20 and kernel size may be 3×3.

The binary mask may be blurred and binarized again at blocks 220 and 225, respectively. Blocks 220 and 225 are optional, however, these operations may reduce holes in the mask to ensure continuous regions.

For example, a 1,4,6,4,1 blurring function may be used on a set of pixels at block 220. To illustrate, the coefficients of the blurring function in this example add up to a value of 16. If the set of pixels has values 1, 1, 0, 1, 1, the product of the blurring function and the pixel values gives a value of 10 (1×1+4×1+6×0+4×1+1×1). The pixels generated by blurring function 220 may then be thresholded again, e.g., at a value of 8, by binarize mask block 225. In this example, the current pixel having the value 0 would actually be binarized into a value of 1.

Once the mask is binarized in block 225, a morphological filtering operation, i.e., opening and dilation may be applied to remove the area that covers the speckle noise. An image is separated into morphological kernels, e.g., a 3×3 block of pixels. An opening and dilation process is applied to each morphological kernel.

The opening process, e.g., erosion process, generates an output image such that the middle pixel in the 3×3 kernel is set to zero whenever any of the pixels inside the kernel is zero. The dilation process generates an output image such that the middle pixel in the 3×3 kernel is set to one whenever any of the pixels inside the kernel is one. The erosion and dilation processes are applied sequentially to the mask produced in block 225. That is, the erosion process is applied first and then the dilation process is applied to the result of the erosion process. The effect of this process is to remove spatially small components from the mask while leaving spatially larger regions relatively unchanged.

In block 235 a blurring function may be applied to the image received from opening and dilation block 230. The final blur of block 235 is an optional action that is useful for generating a smooth transition at the boundary.

The image is recovered at block 240. Image recovery block uses the mask signal generated by mask modifying (collectively blocks 220-235) block 215 to select between the minimum filter signal and the original signal. The recovery image may be generated as follows:

$$\text{Out}(x,y) = Pt(x,y)*\text{mask}(x,y) + \text{Min}(x,y)*(1-\text{mask}(x,y)) \quad (2)$$

where mask(x,y) ranges between 0 and 1; and mask(x,y)=1, represents the pixel replaced by the minimum filter.

It should be noted that the minimum filter can cause some undesirable artifacts due to temporal variation in the scene. The most obvious such effect is that transient bright image events (such as blinking signal lights) are shortened by 1 or two frames due to the minimum filter. In the extreme case where the light is only on for one frame it can disappear completely.

Another problem with the minimum filter is due to image motion. Image motion (either global, due to camera motion, or local, due to object motion) interferes with the temporal comparison embodied in the minimum filter to produce undesirable results: when there is global or local image motion, the minimum filter tends to remove (part on regions that are brighter than the background; and when there is global or local image motion, the minimum filter tends to keep low-intensity structures from both current and previous images, creating doubling of image detail.

To improve on the minimum filter approach, the present invention employs the morphological image recovery technique to solve the above problems by using a masking process that identifies regions that would be replaced by the minimum filter and then uses a morphological operation to remove small regions (corresponding to the impulse structure) from the mask as discussed above.

When the recovered portion of the minimum image is replaced by the original image, because of the pixel difference in these portions between the two images, undesirable artifacts are visible. In order to remove these artifacts a blending scheme to smooth the boundary of the recovery portions is utilized as discussed above.

In 3-frame impulse noise reduction, instead of picking up the minimum values of all three images, the minimum filter is applied only to images at t and t-1, then average with the impulse noise reduced image at t-1. This gives out better result as compared to the pure minimum filter operation.

Figure 3:
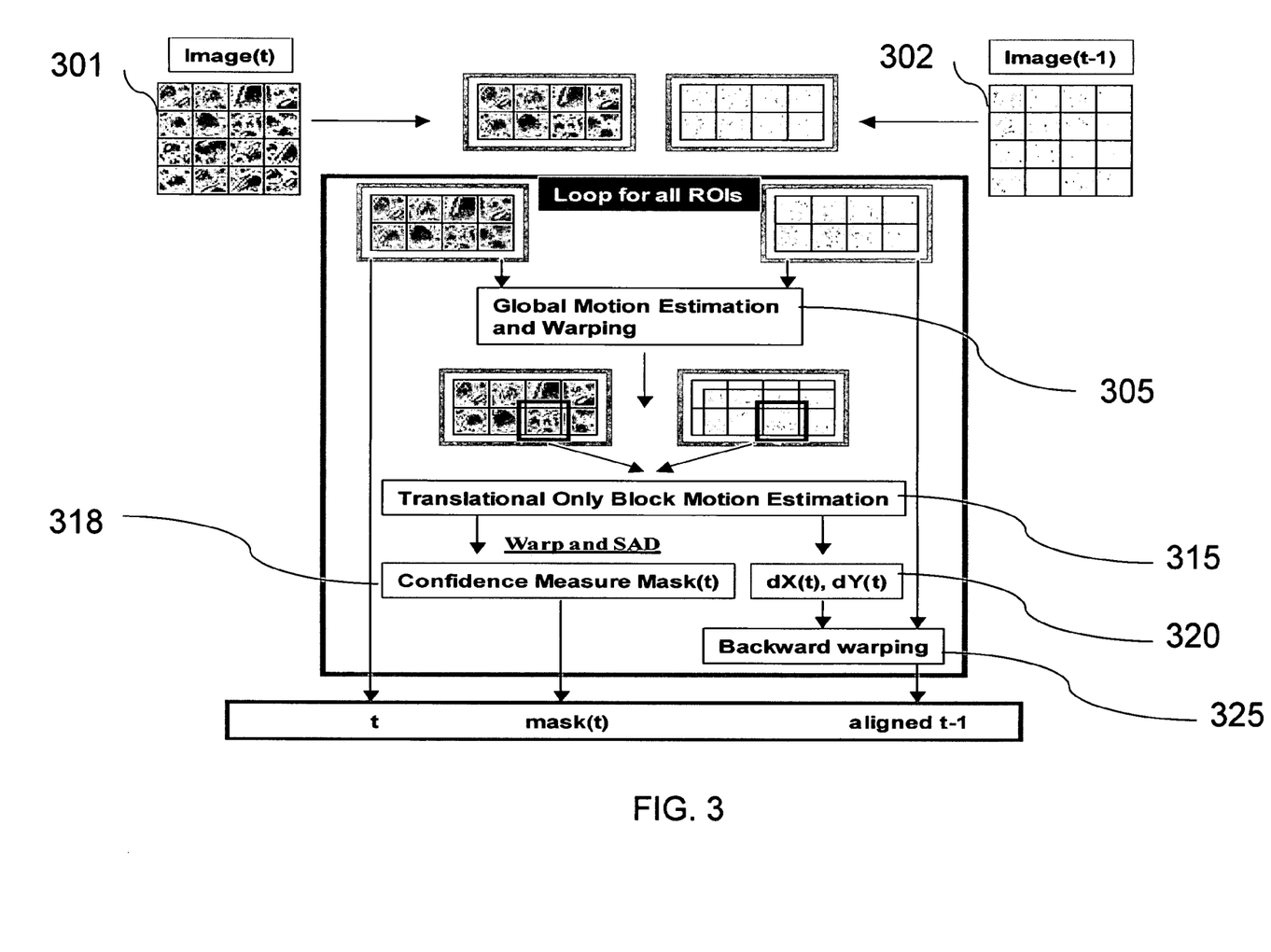
FIG. 3 illustrates hierarchic block motion estimation in accordance with one embodiment of the present invention.

FIG. 3 illustrates hierarchic block motion estimation in accordance with one embodiment of the present invention. As explained above, temporal aligned images are essential in impulse noise reduction to output a clean image with fewer artifacts and better preservation of image features. There are a variety of motion estimation algorithms that can be used for image alignment of the previous frames to the current image. The global approach, in which a parametric function is obtained and applied to all the pixels in the image, is generally more computationally efficient and stable, while the local approach better describes rapid changes in image displacement due to moving objects or motion parallax but is computationally expensive. If the advantages of both approaches are combined, it is possible to apply a limited local motion analysis function while adding only a 25% (4 ms) of a field time in total latency. Below is the list of potential algorithms from simple to complex for motion adaptive noise reduction:

Pixel change: this is the most simple form of motion adaptive based only on the magnitude of local temporal difference. With significant image noise, this is not an adequate measure.

Limited search block motion: motion per 8×8 or 16×16 block with limited search—can only accommodate small motion vectors, but may be sufficient—computes one motion vector for each block, which may cause block artifacts in noise cleaning.

Limited search local motion: per pixel motion based on a local region—same as above but computes a separate vector for each pixel—vectors may be smoothed locally—this process could be implemented at reduced resolution—i.e. level 2 with sub-pixel interpolation and smoothing.

Hierarchical search local motion: per pixel motion with potentially large motion vectors. This method is probably too expensive and introduces too much latency for the additional benefit.

Use of any motion estimator requires a method to provide some level of confidence that the motion is correct. If confidence is low then little or no temporal processing should be applied; if there is higher confidence, then full temporal processing is applied.

The hierarchic block motion estimation is similar to limited search block motion but with various sizes initialized based on the noise level. The motion estimation is used to align image t-1. The aligned image may then be input to impulse noise reduction block 105. Furthermore, in order to obtain more accurate block motion, a region of interest (ROI) of an image within 4 ms latency for National Television System Committee (NTSC) video is used for global estimation and sets the initial motion for blocks inside the ROI. The hierarchic block motion estimation is applied to all regions of interest in the following manner. If a NTSC field time is 16 ms with a size of 720×244, this field can be divided into at least 4 ROIs, each of which is 720×61 and is read in sequentially. The current field is referred to as a reference image 301, and the previous field is referred to as an inspection image 302, the global motion estimation method finds the global motion of all pixels inside the ROI and pre-warps the inspection image accordingly at element 305. Translational block motion estimation in element 315 is performed using a hierarchical estimation process optionally operating over multiple pyramid levels. In the exemplary embodiment described the motion function is obtained using pyramid levels 1 through 3 to avoid noise. Each ROI is divided into smaller blocks, with typical fixed size of 32×32 or 64×32, to apply translational only motion estimation on pyramid level 1 and 2 inside each block. Block position in the inspection does not move, which can be modified to extend dynamic search range. After motion vectors are obtained for a block at element 315, the block in the inspection image is warped and a sum of absolute difference (SAD) between the reference and the inspection block is calculated. If the average of the SAD is larger than a specified threshold that block is marked as invalid in confidence measure 318. If 30% of total blocks inside a ROI are invalid, then the whole image may be considered invalid. When the motion vector calculation in the first ROI is completed, the inspection ROI gets warped by the backward warping function and its result is directly sent to the minimum filter. Backward warper 325 also receives input from element 320. Meanwhile, the next ROI has already been read in and the hierarchic motion analysis begins for the next ROI.

Figure 4:
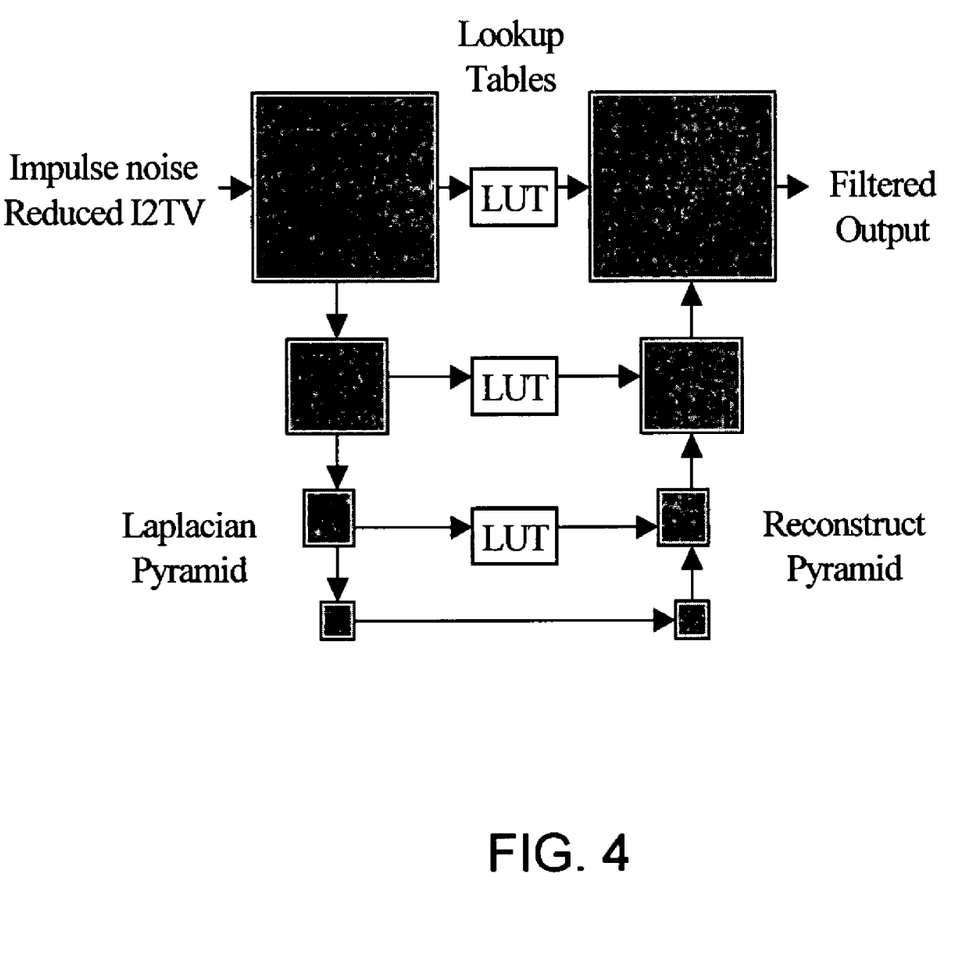
FIG. 4 illustrates a wide-band Gaussian noise reduction method according to one embodiment of the present invention.

FIG. 4 illustrates a wide-band Gaussian noise reduction method according to one embodiment of the present invention.

As stated in the Gaussian noise analysis, Gaussian noise component has a relatively broad spatial frequency spectrum and a relatively long temporal correlation. Traditional spatial linear filters have a limited effectiveness, and temporal IIR filter is effective but may generate visible latency and artifacts. Based on the characteristics of Gaussian noise type, a purely spatial approach is adopted based on adaptive nonlinear lookup table modification applied to signal components that concentrate noise structure.

In one embodiment, the present invention uses a Laplacian Pyramid structure to decompose the image into broad subbands representing different scales of image structure. It should be noted that other subband decomposition methods can be employed. Each subband is to pass through a nonlinear lookup table, e.g., an intensity lookup table, that selectively suppresses small amplitude variations (more likely to represent noise) while allowing larger signal components to pass through unchanged. An intensity lookup table, although not shown in FIG. 4 may also be used with the lowest level of the Laplacian pyramid.

In order to determine appropriate nonlinear transformations to apply to each pyramid subband, the intensity distributions of clean and noisy image sequences are compared and intensity transformations that match these distributions to each other are estimated.

Note that all functions leave large values of the input unchanged but compress different ranges of values near 0. The shape of these functions is controlled by three parameters specifying the width, slope at the origin, and curvature. The general function for each pyramid level is as follows:

If 0<x<width, $$y(x)=(1.0-(k-1.0)\cdot\cos{}^n(\pi x/2w) \quad (3)$$

else if x>=width $$y(x)=x \quad (4)$$

where k is slope, w is width, and n is power. When x<0, y(x)=−y(−x).

Figure 5:
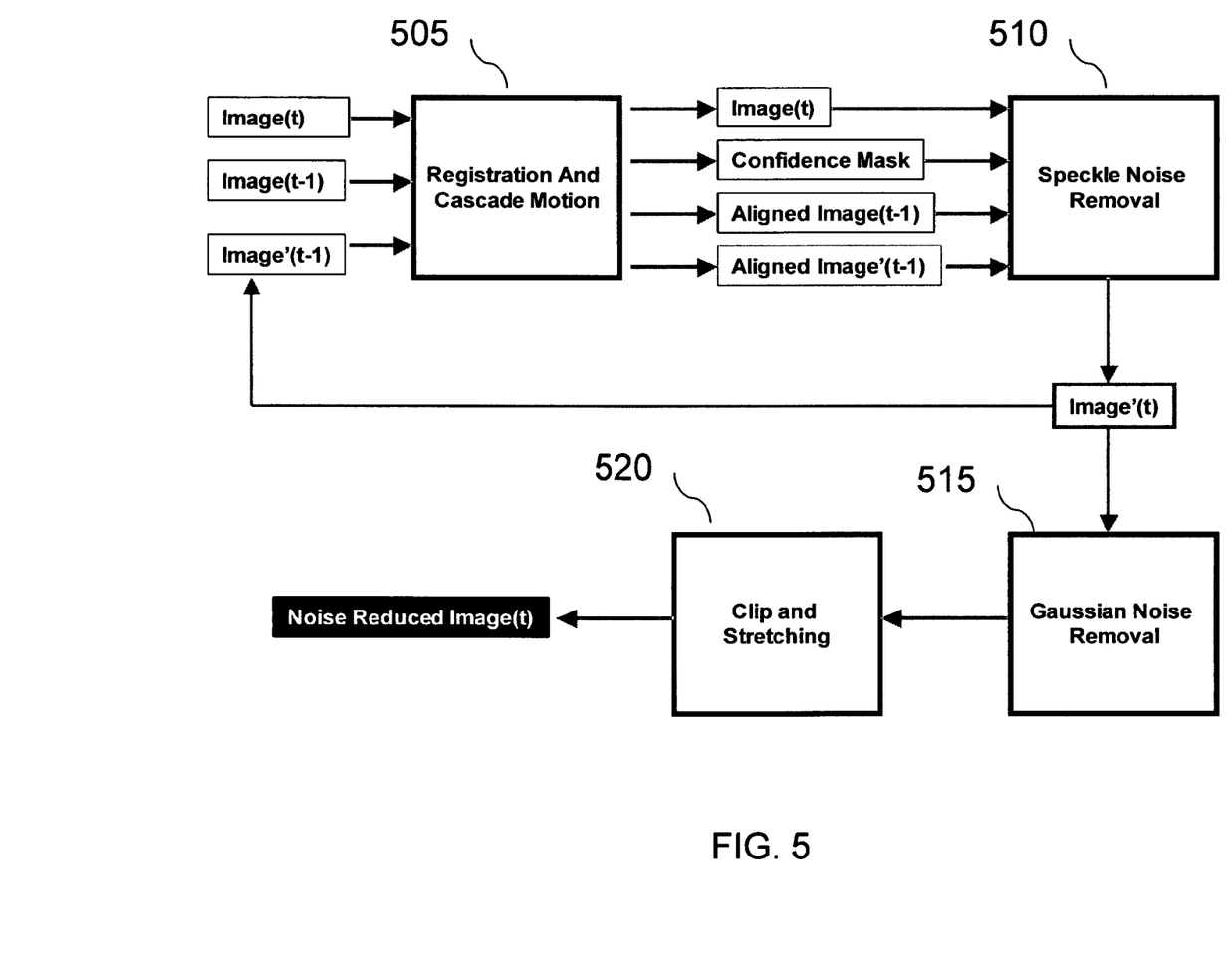
FIG. 5 illustrates a more detailed noise reduction flow diagram according to one embodiment of the present invention.

FIG. 5 illustrates a more detailed noise reduction flow diagram according to one embodiment of the present invention. In block 505 input images are registered and motion information (e.g., motion estimation information) is obtained. Block 505 outputs the original image, a confidence mask, an aligned previous image, and an aligned previous image with speckle noise removed. A confidence mask, e.g., confidence mask 318, is also obtained. If the confidence measure is very low then the original input is used rather than the registered input. Speckle noise is removed at block 510. Gaussian noise is removed at block 515. The clean image, e.g., the image with speckle noise and Gaussian noise removed, can be stretched for better display result in clipping and stretching block 520.

Figure 6:
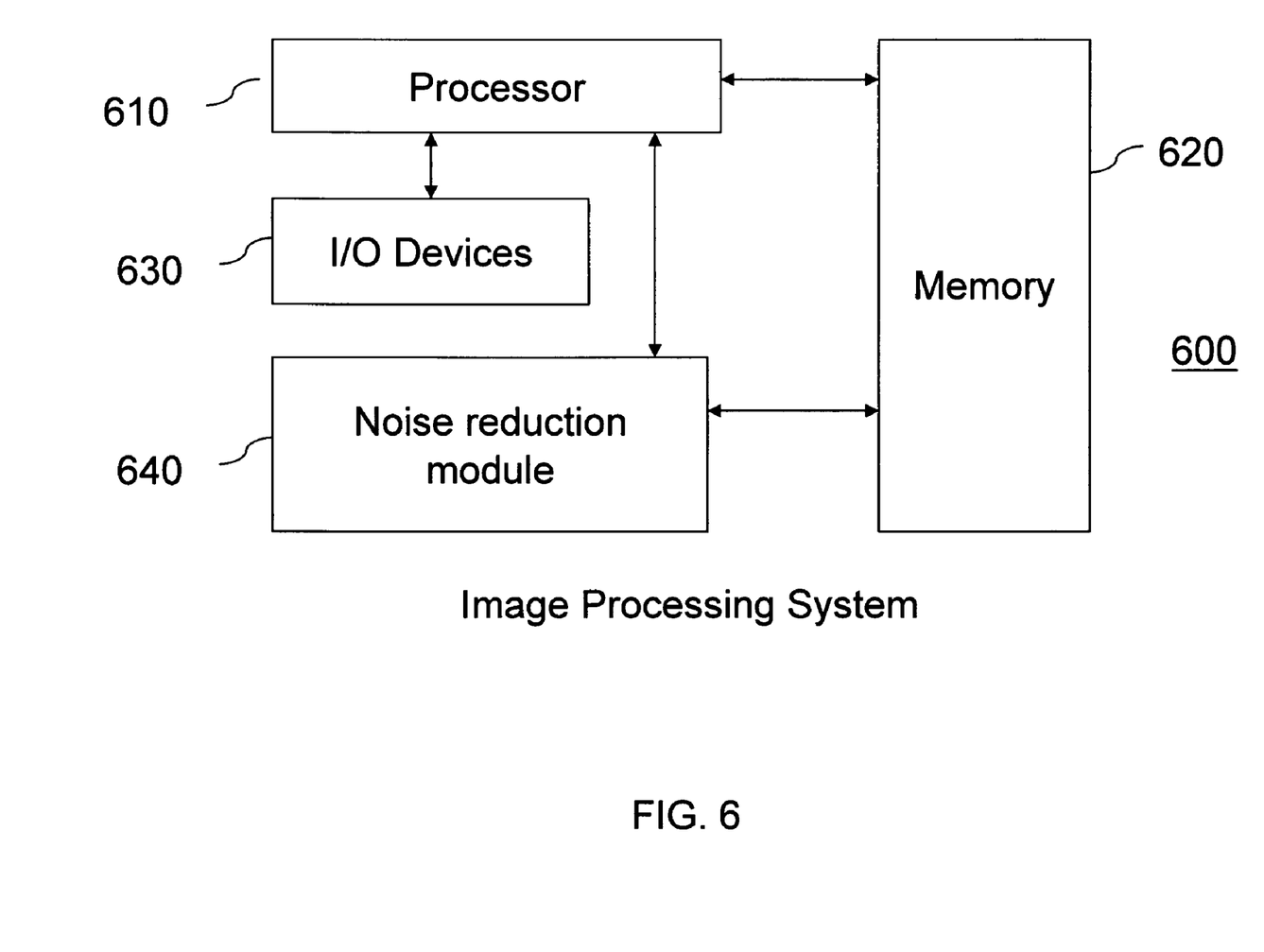
FIG. 6 illustrates a block diagram of an image processing device or system according to one embodiment of the present invention.

FIG. 6 illustrates a block diagram of an image processing device or system 600 of the present invention. Specifically, the system can be employed to reduce noise. In one embodiment, the image processing device or system 600 is implemented using a general purpose computer or any other hardware equivalents.

Thus, image processing device or system 600 comprises a processor (CPU) 610, a memory 620, e.g., random access memory (RAM) and/or read only memory (ROM), noise reduction module 640, and various input/output devices 630, (e.g., storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device (such as a keyboard, a keypad, a mouse, and the like, or a microphone for capturing speech commands)).

It should be understood that the noise reduction module 640 can be implemented as one or more physical devices that are coupled to the CPU 610 through a communication channel. Alternatively, the noise reduction module 640 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 620 of the computer. As such, the noise reduction module 640 (including associated data structures) of the present invention can be stored on a computer readable medium, e.g., RAM memory, magnetic or optical drive or diskette and the like.

While the foregoing is directed to embodiments of the present invention, other and further embodiments of the invention may be devised without departing from the basic scope thereof, and the scope thereof is determined by the claims that follow.

The invention claimed is:

1. A method for reducing noise in at least one frame in an image sequence, comprising:
    applying a minimum filter to said at least one frame to produce a plurality of minimum values;
    generating a mask in accordance with said plurality of minimum values; and applying said mask to reduce said noise in said at least one frame.

2. The method of claim 1, wherein said noise is impulse noise.

3. The method of claim 1, wherein said at least one frame is an image intensified television frame.

4. The method of claim 1, further comprising:
    applying an opening process to said mask; and applying a dilation process to said mask.

5. The method of claim 1, wherein said applying said mask, comprises:
    computing motion estimation information between at least two frames of said image sequence; and
    applying said motion estimation information to assist in applying said mask to reduce said noise.

6. The method of claim 1, further comprising: reducing a wideband non-linear noise from said at least one frame.

7. The method of claim 6, where said reducing said wideband non-linear noise comprises:
    decomposing said at least one frame into a plurality of subbands; and
    using at least one look-up table to reduce small amplitude variations in at least one of said subbands.

8. A computer-readable medium having stored thereon a plurality of instructions, the plurality of instructions including instructions which, when executed by a processor, cause the processor to perform the steps of a method for reducing noise in at least one frame in an image sequence, comprising:
    applying a minimum filter to said at least one frame to produce a plurality of minimum values;
    generating a mask in accordance with said plurality of minimum values; and
    applying said mask to reduce said noise in said at least one frame.

9. An apparatus for reducing noise in at least one frame in an image sequence, comprising:
    means for applying a minimum filter to said at least one frame to produce a plurality of minimum values;
    means for generating a mask in accordance with said plurality of minimum values; and
    means for applying said mask to reduce said noise in said at least one frame.

* * * * *